(12) United States Patent
Chen et al.

(10) Patent No.: US 8,972,919 B2
(45) Date of Patent: *Mar. 3, 2015

(54) STATIC TIMING ANALYSIS METHOD AND SYSTEM CONSIDERING CAPACITIVE COUPLING AND DOUBLE PATTERNING MASK MISALIGNMENT

(71) Applicant: Taiwan Semiconductor Manufacturing Co., Ltd., Hsin-Chu (TW)

(72) Inventors: Wen-Hao Chen, Hsin-Chu (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,330

(22) Filed: Nov. 11, 2013

(65) Prior Publication Data

US 2014/0068537 A1 Mar. 6, 2014

Related U.S. Application Data

(63) Continuation of application No. 13/723,248, filed on Dec. 21, 2012, now Pat. No. 8,612,912.

(60) Provisional application No. 61/668,064, filed on Jul. 5, 2012.

(51) Int. Cl.
*G06F 17/50* (2006.01)
(52) U.S. Cl.
CPC ........ *G06F 17/5081* (2013.01); *G06F 17/5031* (2013.01); *G06F 17/504* (2013.01); *G06F 2217/84* (2013.01)
USPC ............ 716/113; 716/110; 716/132; 716/134
(58) Field of Classification Search
USPC .................................. 716/110, 113, 132, 134
See application file for complete search history.

(56) References Cited

U.S. PATENT DOCUMENTS 8,316,340 B2   11/2012   Chen et al.
8,327,301 B2   12/2012   Cheng et al.
(Continued)

OTHER PUBLICATIONS

Pan David Z. et al., "CAD for Double Patterning Lithography", 2010, IEEE, pp. 122-125.*
Jeong, K. et al., "A framework for chip-level evaluation to misalignment and linewidth error impacts across double-patterning technology options", 2011, Global foundries, pp. 1-8.
Jeong, K. et al., "Is overlay error more important than interconnect variations in double patterning?", Jul. 2009, ACM 978-60558-576-5/09/07, pp. 1-8.
(Continued)

*Primary Examiner* — Stacy Whitmore
(74) *Attorney, Agent, or Firm* — Duane Morris LLP; Steven E. Koffs

(57) ABSTRACT

A method for analyzing an IC design, comprises: using a computer implemented electronic design automation tool to perform a parasitic RC extraction for a layout of the IC design, the parasitic RC extraction outputting for each of a plurality of routing paths, a nominal capacitive coupling, a minimum capacitive coupling and a maximum capacitive coupling, where the minimum and maximum capacitive couplings correspond to circuit patterning in the presence of double patterning mask misalignments; and performing one of a setup time analysis or a hold time analysis of the IC design using a computer implemented static timing analysis tool. For a given flip-flop having a launch path and a capture path, the setup or hold time analyses is performed using the minimum capacitive coupling for one of the launch and capture paths and the maximum capacitive coupling for the other of the launch and capture paths.

20 Claims, 11 Drawing Sheets

(56) References Cited

U.S. PATENT DOCUMENTS

| | | |
|---|---|---|
| 8,448,120 B2 | 5/2013 | Huang et al. |
| 2008/0127000 A1 | 5/2008 | Majumder et al. |
| 2013/0191796 A1 | 7/2013 | Chen et al. |

OTHER PUBLICATIONS

Biddle, A., "Critical Tools for 20nm Design", Sep. 2012, Synopsis, obtained at http://techdesignforums.com/practice/technique/critical-tools-for-20nm-design/ on Aug. 7, 2013, pp. 1-6.

* cited by examiner

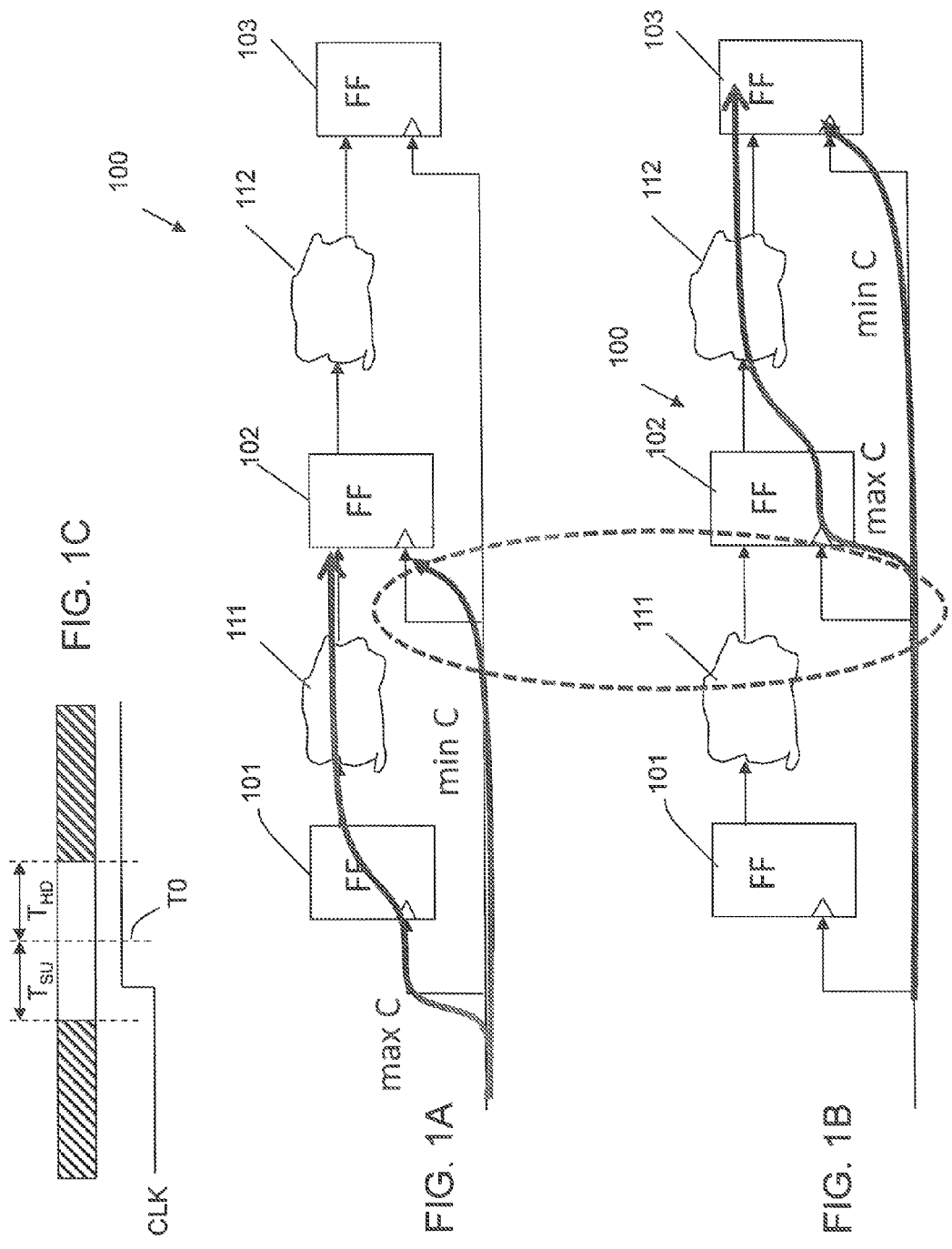

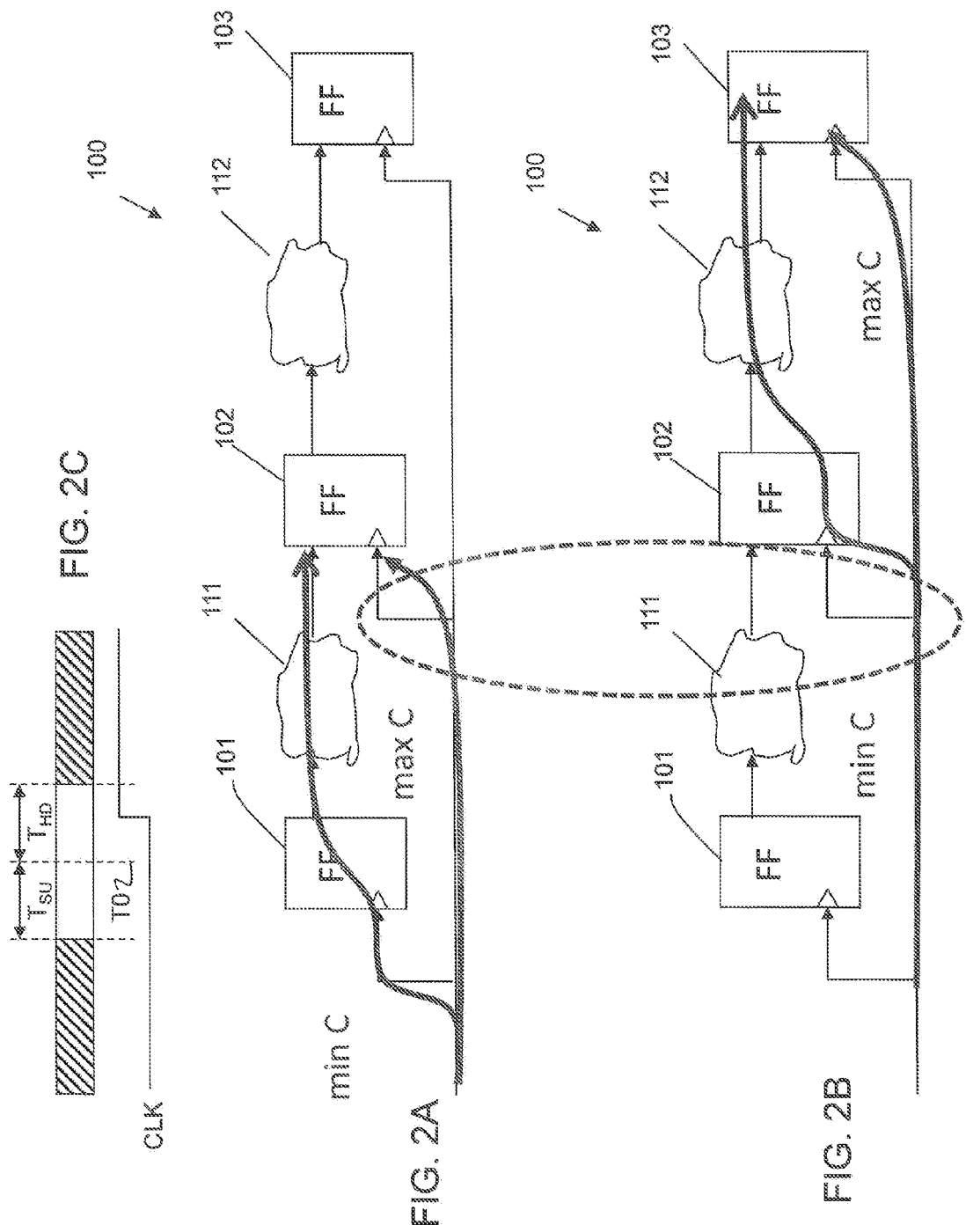

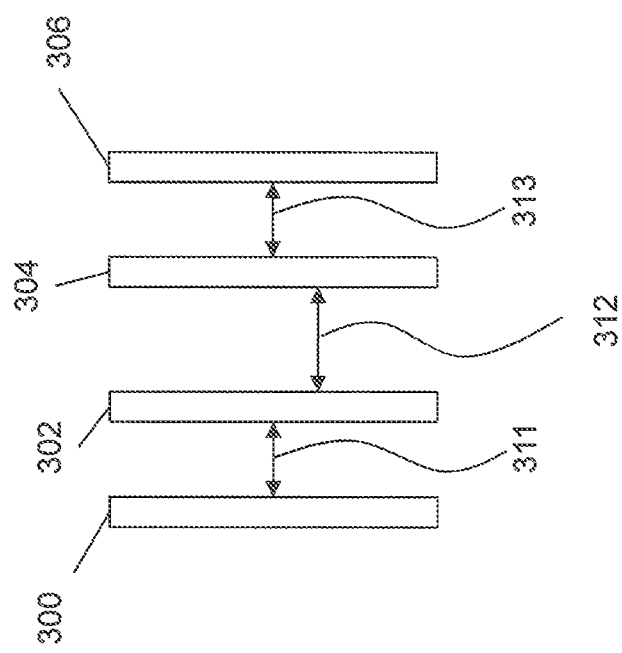

STATIC TIMING ANALYSIS METHOD AND SYSTEM CONSIDERING CAPACITIVE COUPLING AND DOUBLE PATTERNING MASK MISALIGNMENT

This application is a continuation of U.S. patent application Ser. No. 13/723,248, filed Dec. 21, 2012, which claims the benefit of U.S. Provisional Patent Application No. 61/668,064, filed Jul. 5, 2012, both of which are incorporated by reference herein in their entireties.

FIELD

This disclosure relates to integrated circuits (IC) generally and more specifically to computer implemented tools for analysis of ICs.

BACKGROUND

Static timing analysis (STA) is used for validating timing performance of an integrated circuit design. During static timing analysis, delays along the respective paths between each respective start point and end point (e.g., pair of flip-flops, paths to/from SRAM or other macro) is checked under corner conditions. For a given path, the delay analysis takes into account the combinatorial logic along the path, and the parasitic capacitive couplings between the conductive lines in the interconnect layers of the IC. The STA determines whether the correct data are present at the data input of each flip-flop when the clock signal input to that flip-flop changes. The STA includes both setup time analysis and hold time analysis.

To correctly capture data, the data should be held steady at the data input of the capture flip-flop for at least a "setup time" ($T_{SU}$) before the clock signal transition at the clock input to the capture flip-flop. Verifying compliance with this condition is called setup time analysis. Failure to satisfy this condition results in a setup time violation.

In addition, the data should be held steady at the data input of the capture flip-flop for at least a hold time ($T_{HD}$) after the clock signal transition at the clock input to the capture flip-flop. Verifying compliance with this condition is called hold time analysis. Failure to satisfy this condition results in a hold time violation.

STA allows a rapid check of the timing of every path.

BRIEF DESCRIPTION OF THE DRAWINGS

FIGS. 1A and 1B show launch and capture paths between two flip-flops for setup time analysis when double patterning (DPT) is used.

FIG. 1C is a timing diagram showing a setup time violation in the scenario of FIGS. 1A and 1B.

FIGS. 2A and 2B show launch and capture paths between two flip-flops for hold time analysis when DPT is used.

FIG. 2C is a timing diagram showing a hold time violation in the scenario of FIGS. 2A and 2B.

FIG. 3 shows an effect of pre-grouping polygons for DPT.

DETAILED DESCRIPTION

This description of the exemplary embodiments is intended to be read in connection with the accompanying drawings, which are to be considered part of the entire written description.

Unless otherwise expressly stated below, the term "polygon" as used herein refers to a pattern of material formed on, in or above a semiconductor substrate in an IC fabrication process.

The inventors have recognized that the introduction of DPT changes the worst case timing conditions for STA. Whereas patterning with a single mask per layer uses worst-case (corner) conditions in which all parasitic capacitances are maximized, or all parasitic couplings are minimized, DPT makes it possible that other worst case timing conditions may be encountered.

Figure 4A:
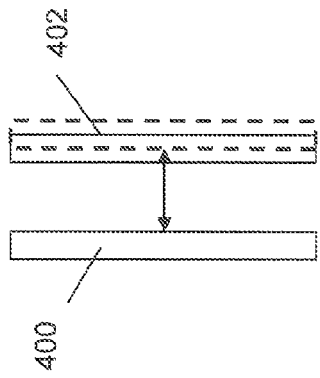
FIGS. 4A-4C shows the effect of mask misalignment on the couplings between polygons for DPT.
Figure 4B:
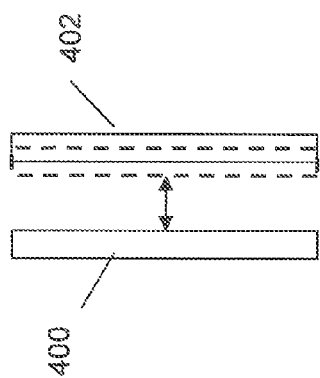
Figure 4C:
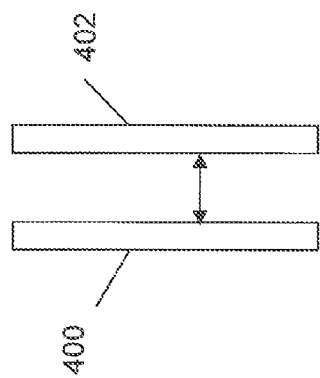

For example, with reference to FIGS. 4A-4C, a pair of interconnect layer polygons (routing paths) 400, 402 are to be formed by two photomasks on the same layer of an IC. The patterns are separated by a nominal distance, and have a nominal parasitic capacitive coupling between them. In FIG. 4B, if a mask misalignment refers to polygon 402 being formed closer to polygon 400 (as shown in phantom), the distance is decreased, and the parasitic capacitive coupling increases. In FIG. 4C, if a mask misalignment refers to polygon 402 being formed further from polygon 400 (as shown in phantom), the distance is increased, and the parasitic capacitive coupling decreases.

Figure 5:
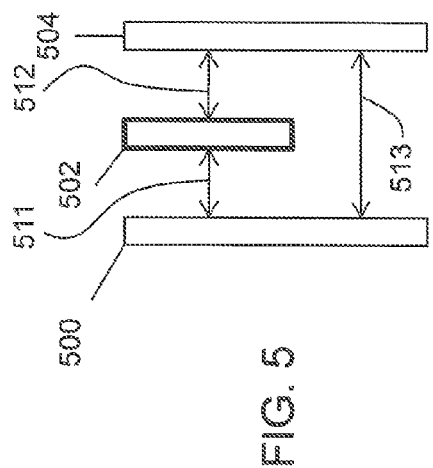
FIG. 5 shows a configuration of polygons for DPT.

Referring now to FIG. 5, a configuration has three interconnect layer polygons (routing paths) 500, 502, and 504, in which the separation between pairs of adjacent polygons is less than the minimum separation distance for forming all the patterns using a single photomask. That is, polygons 500 and 502 are too close to each other to be formed clearly with a single photomask, and patterns 502 and 504 are too close to each other to be formed clearly with a single photomask According to DPT methodology, patterns 500 and 504 are formed on a layer of the IC substrate (not shown) using a first photomask, and pattern 502 is formed on the same layer of the IC substrate using a second photomask. Because the spacing between patterns 500 and 504 is greater than the minimum separation distance, both can be formed clearly with the same photomask as each other.

The proper spacing between polygons 500 and 502 (and between polygons 502 and 504) are maintained by accurately aligning the second photomask with the patterns formed by the first photomask. If the second photomask is not properly aligned, the spacing between patterns 500 and 502 can be smaller than the nominal design value, in which case the spacing between patterns 502 and 504 is larger than the nominal design value. If the misalignment is in the opposite direction, the spacing between patterns 500 and 502 can be larger than the nominal design value, in which case the spacing between patterns 502 and 504 is smaller than the nominal design value. Thus, DPT introduces scenarios in which a first pair of polygons is closer to each other than the nominal distance, and an adjacent pair of polygons is farther from each other than the nominal distance.

The inventors have further realized that the spacing variations result in variations of the parasitic capacitive couplings between adjacent polygons. For purposes of the STA, timing is particularly sensitive to variations in the separation between the conductive patterns in the interconnect layers (e.g., M1, M2, M3, . . . , $M_T$). When a pair of polygons (conductive patterns) are closer together than the nominal distance, the parasitic capacitive coupling between that pair of polygons is larger than the nominal parasitic capacitive coupling, increasing transmission delay across those polygons. (As used herein, the "nominal capacitive coupling" refers to the RC parasitic capacitive coupling calculated by an RC extraction tool in the absence of any DPT misalignment.) When a pair of polygons (conductive patterns) are farther apart than the nominal distance, the parasitic capacitive coupling between that pair of polygons is smaller than the nominal parasitic capacitance, decreasing transmission delay across one of those polygons. In the presence of DPT mask misalignment, both of these conditions are present at the same time for different pairs of polygons. Thus, the STA should validate timing closure in the presence of DPT misalignments.

In various DPT scenarios, if the maximum parasitic capacitive coupling is used for every pair of polygons, or if the minimum capacitive coupling is used for every pair of polygons, the actual worst case scenario will be different from that predicted by the STA.

Thus, an RC extraction method is introduced herein, in which the RC extraction tool is capable of outputting two or more parasitic capacitive coupling between any given pair of routing paths: a minimum value, and a maximum value. In some embodiments, a nominal value is also provided, in addition to minimum and maximum values. A STA tool is introduced which accepts the three parasitic capacitance values, and uses the appropriate values for worst case setup time and hold time analysis. In examples discussed below, the various timing paths connect pairs of synchronizing elements which are flip-flops. This is only by way of example, and does not limit the method. The method described herein can be used for other timing paths, such as paths to or from SRAM, or other IP macro, for example. Other examples include purely combinational path (path starting from chip input port and ending at chip output port).paths starting from an input port and ending at the data input of a register. a path starting from output of a register and ending at the output port of a chip. and a purely register to register path.

FIGS. 1A and 1B show a setup time scenario for RC extraction of a path which includes flip-flops 101-103 and combinatorial logic 111 and 112. FIG. 1A shows a transmission of data between the launch flip-flop 101 and the capture flip-flop 102. FIG. 1B shows transmission of data between the launch flip-flop 102 and the capture flip-flop 103. One of ordinary skill in the art understands that the same flip-flop serves as capture flip-flop in FIG. 1A and as launch flip-flop in FIG. 1B. FIG. 1B can be viewed as either representing transmission of earlier received data by flip-flop 102 during the same clock cycle as shown in FIG. 1A. Alternatively, FIG. 1B can be viewed as representing transmission to flip-flop 103 of the same data transmitted to flip-flop 102 in FIG. 1A, during the following clock cycle.

FIG. 1C shows a timing diagram for the scenario of FIGS. 1A and 1B. For correct data capture, the data at the input to the flip-flops 102, 103 should be stable for at least the setup time $T_{SU}$ before the clock transition and for a period $T_{HD}$ after the clock transition. If the nominal clock transition time is T0, then the data input should be stabile from time T0-$T_{SU}$ until time T+$T_{HD}$.

As shown in FIGS. 1A and 1B, one worst case condition occurs when the routing path delivering the clock signal has a minimum capacitive coupling (as a result of a misalignment which positions polygon(s) adjacent to the clock line further from the clock line than the nominal value. This decreases transmission delay and causes the clock signal to arrive earlier than the nominal delay. At the same time, the launch path connecting flip-flops 101, 102, 103 has adjacent polygons (conductive patterns) which are closer to the launch path than the nominal value, so that the parasitic capacitive coupling of the launch path is greater than the nominal value. This increases transmission delay and causes the data to arrive later than the nominal delay. As a result, the clock signal arrives early relative to the time T0, which is which represents a setup time violation. The data are not stable for a period $T_{SU}$ before the clock transition at T0.

FIGS. 2A and 2B show a hold time scenario for RC extraction of a path which includes the same flip-flops 101-103 and combinatorial logic 111 and 112. FIG. 2A shows a transmission of data between the launch flip-flop 101 and the capture flip-flop 102. FIG. 1B shows transmission of data between the launch flip-flop 102 and the capture flip-flop 103.

FIG. 2C shows a timing diagram for the scenario of FIGS. 2A and 2B. As shown in FIGS. 2A and 2B, another worst case condition occurs when the routing path delivering the clock signal has a maximum capacitive coupling (as a result of a misalignment in the opposite direction from the scenario of FIGS. 1A-1C. The scenario of FIGS. 2A-2C positions polygon(s) adjacent to the clock line closer to the clock line than the nominal value. This increases transmission delay and causes the clock signal to arrive later than the nominal delay. At the same time, the launch path connecting flip-flops 101, 102, 103 has adjacent polygons (conductive patterns) which are farther from the launch path than the nominal value, so that the parasitic capacitive coupling of the launch path is less than the nominal value. This decreases transmission delay and causes the data to arrive earlier than the nominal delay. As a result, the clock signal arrives late relative to the time T0, which is which represents a hold time violation. The data are not stable for a period $T_{HD}$ after the clock transition at T0.

Figure 6:
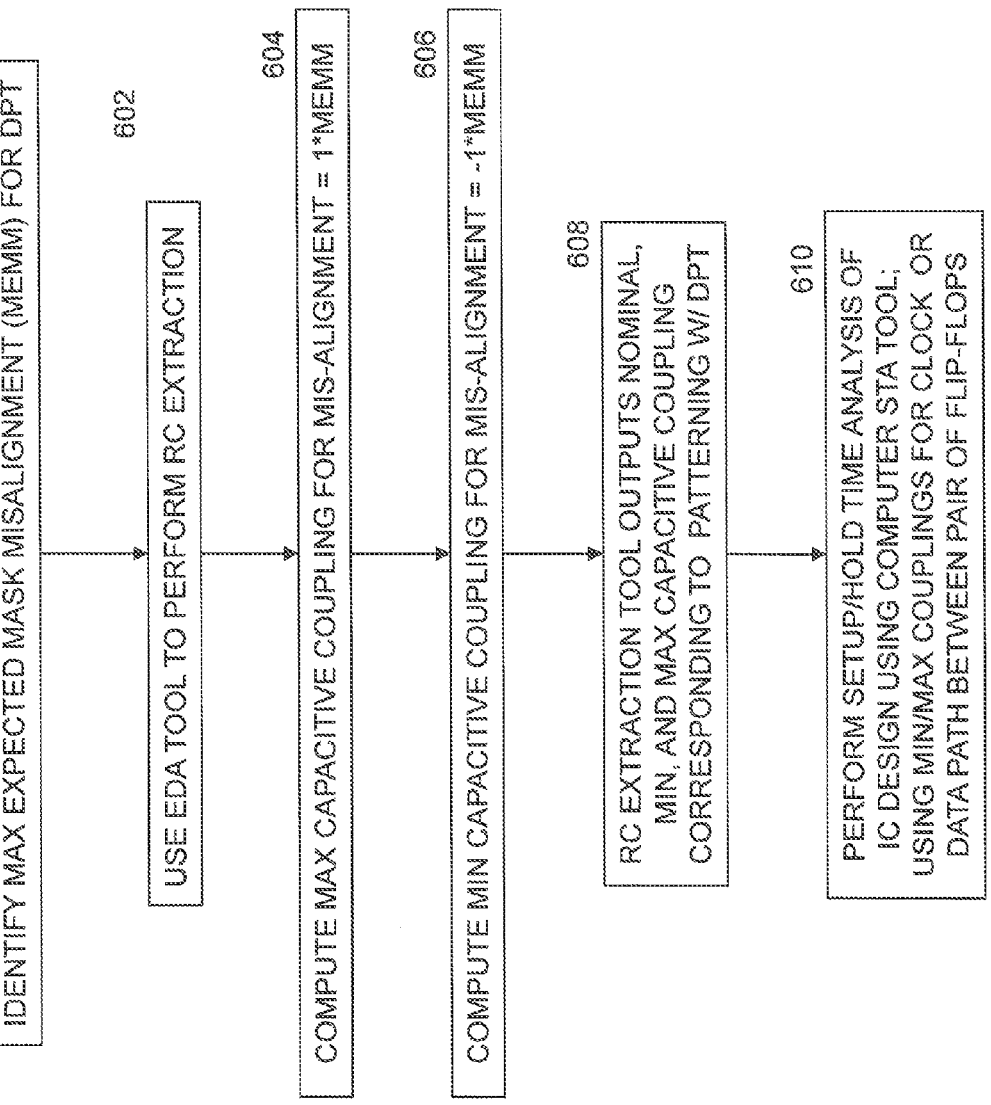
FIG. 6 is a flow chart of an STA method using mis-alignment aware RC extraction of parasitic capacitive couplings.

FIG. 6 is a flow chart of a method which accommodates the scenarios which can arise when DPT is used, and mask misalignments occur.

At step 600, a maximum expected mask misalignment (MEMM) for DPT is identified. For example, a 3 standard deviation (3σ) mask misalignment can be used as the MEMM. This value is input to the EDA RC extraction tool for use when determining parasitic capacitive couplings.

At step 602, a computer implemented electronic design automation (EDA) tool is used to perform a parasitic RC extraction for a layout of the IC design. The RC extraction computes at least a nominal parasitic RC capacitive coupling for each pair of adjacent polygons in the conductive interconnect layers.

At step 604, the parasitic RC extraction additionally computes, for each of a plurality of routing paths, a maximum capacitive coupling. This value is based on a relative misalignment between the photomasks used to form the adjacent patterns of +1*MEMM.

At step 606, the parasitic RC extraction computes, for each of a plurality of routing paths, a minimum capacitive coupling. This value is based on a relative misalignment between the photomasks used to form the adjacent patterns of −1*MEMM. That is, the magnitude of the misalignment is the same, but the relative direction is opposite.

At step 608, the RC extraction tool outputs the nominal, minimum and maximum capacitive couplings corresponding to patterning a circuit using DPT.

At step 610, one of a setup time analysis or a hold time analysis of the IC design is performed using a computer implemented static timing analysis (STA) tool. For a given flip-flop having launch and capture paths, the setup or hold time analyses is performed using the minimum capacitive coupling for one of the launch and capture paths and the maximum capacitive coupling for the other of the launch and capture paths.

Figure 7:
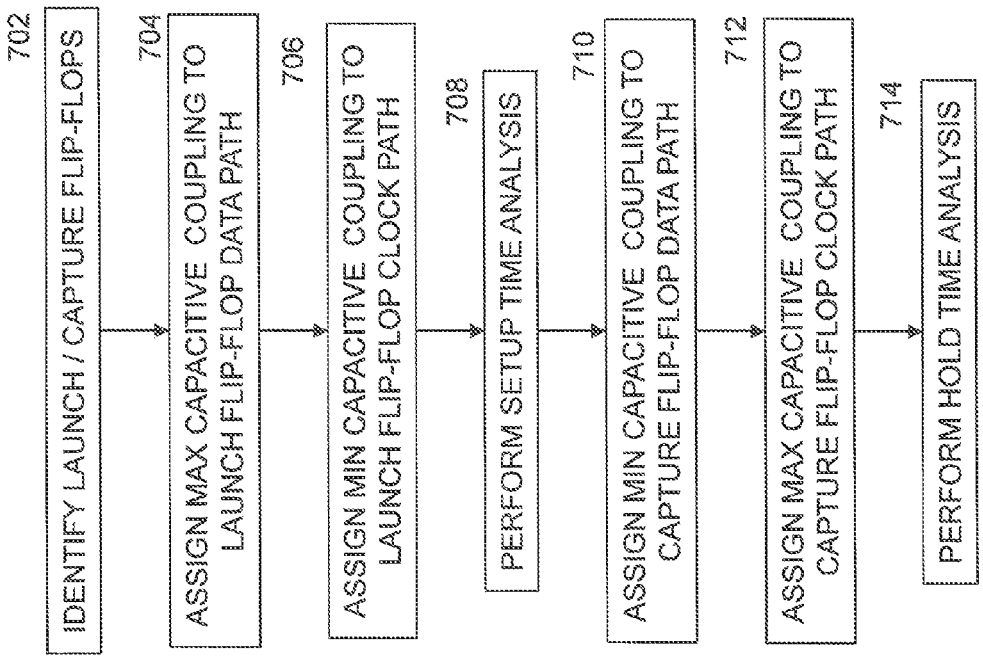
FIG. 7 is a flow chart showing details of selecting the appropriate capacitive couplings for setup and hold time analysis, respectively.

FIG. 7 is a flow chart showing details of identifying the appropriate capacitive coupling to use for each flip-flop, for the setup and hold time analysis of a given path. In some embodiments, the RC extraction tool outputs nominal, maximum and minimum parasitic capacitance values for each pair of polygons, and the STA tool uses the method of FIG. 7 to select the appropriate capacitive coupling for each analytical task.

At step 702, the launch and capture flip-flops are identified.

At step 704, for a given launch flip-flop, the maximum capacitive coupling is assigned for the launch path of the launch flip-flop.

At step 706, the minimum capacitive coupling is assigned for the capture path of the launch flip-flop.

At step 708, the setup time analysis is performed using the capacitive couplings assigned in steps 704 and 706.

At step 710, for a given capture flip-flop, the minimum capacitive coupling is assigned for the launch path of the capture flip-flop.

At step 712, the maximum capacitive coupling is assigned for the capture path of the capture flip-flop.

At step 714, the hold time analysis is performed using the capacitive couplings assigned in steps 710 and 712.

Figure 8:
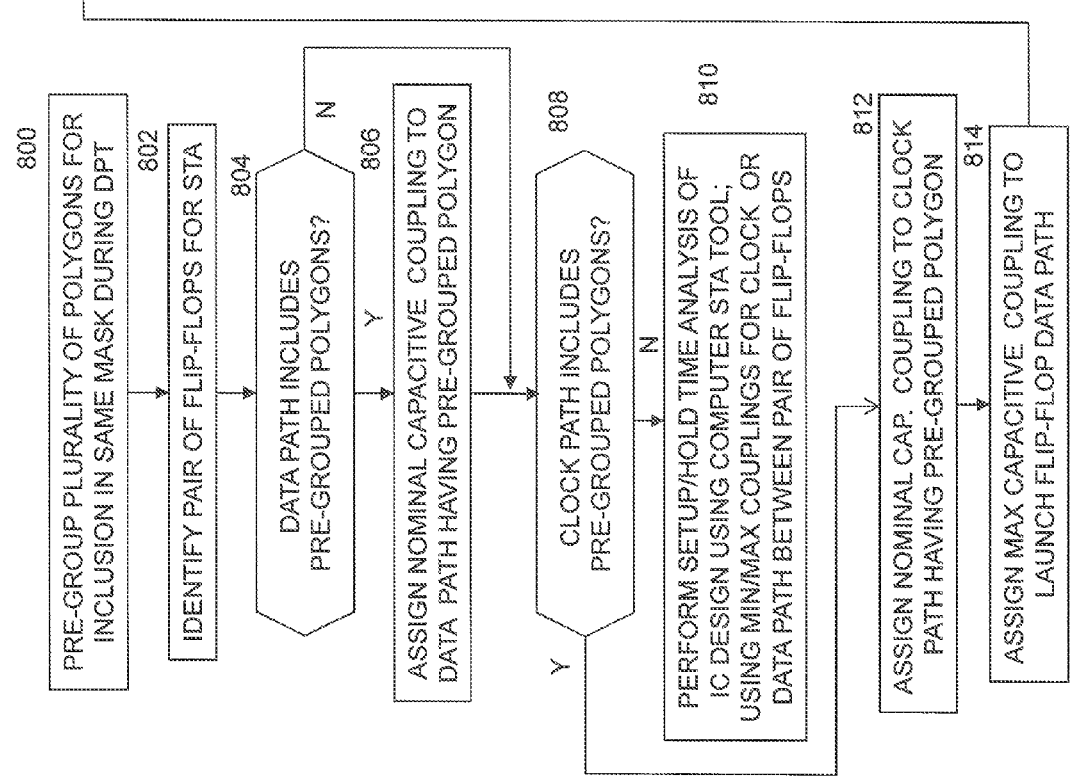
FIG. 8 is a flow chart of a variation of the method suitable for use when at least one pair of polygons is pre-grouped prior to DPT assignments.

FIG. 8 shows a detailed flow chart for using the plural capacitive coupling values provided by the DPT aware RC extraction. The embodiment of FIG. 8 also accommodates pre-grouping capabilities.

Pre-grouping is a capability which the EDA tool can provide to the designer (or foundry) for DPT, allowing the user to exercise greater control over routing decisions. Pre-grouping allows the user to select two or more polygons which should be formed using the same photomask. For example, after a preliminary layout is generated, but prior to assignment of individual polygons to respective photomasks, the EDA tool can display a portion of the layout to the user, and allow the user to select two or more polygons to be formed on the same mask. When a set of polygons are pre-grouped, the EDA tool can put that set of polygons on either mask, but the EDA tool is constrained to keep those polygons together with each other. As an example, the designer can choose to pre-group all of the clock tree network patterns on a given layer so that they are formed by the same photomask. By pre-grouping a set of polygons, the designer can ensure that the capacitive couplings with the pre-grouped set of patterns are not affected by DPT mask misalignments.

Because polygons which are pre-grouped are not susceptible to DPT misalignment effects, computing resources can be saved by only using a single parasitic capacitance value between any pair of pre-grouped polygons.

At step 800, the designer inputs selection data into the EDA tool for pre-grouping a plurality of polygons. These polygons will be included in the same photomask during DPT mask assignment.

At step 802, a pair of flip-flops defining a timing path is identified for STA.

At step 804, a determination is made whether the launch path includes pre-grouped polygons. If the launch path includes pre-grouped polygons, step 806 is executed next. If not, step 816 is executed next.

At step 806, the nominal capacitive coupling value is assigned to the launch path having pre-grouped a polygon.

At step 808, a determination is made whether the capture path includes pre-grouped polygons. If the capture path includes pre-grouped polygons, step 812 is executed next. If not, step 810 is executed next.

At step 810, if the path for which timing is being verified does not involve any pre-grouped patterns, the setup and hold time analysis of the IC design are performed using the computer implemented STA tool. The minimum and maximum couplings are used for the capture and launch paths between the pair of flip-flops, using the method described above with reference to FIGS. 6 and 7.

At step 812, the nominal capacitive coupling value is assigned to the capture path having pre-grouped a polygon.

At step 814, for a given launch flip-flop, the maximum capacitive coupling is assigned for the launch path of the launch flip-flop.

At step 816, the minimum capacitive coupling is assigned for the capture path of the launch flip-flop.

At step 818, the setup time analysis is performed using the capacitive couplings assigned in steps 814 and 816.

At step 820, for a given capture flip-flop, the minimum capacitive coupling is assigned for the launch path of the capture flip-flop.

At step 822, the maximum capacitive coupling is assigned for the capture path of the capture flip-flop.

At step 824, the hold time analysis is performed using the capacitive couplings assigned in steps 820 and 822.

At step 832, the hold time analysis is performed using the parasitic capacitive couplings assigned in steps 812 and 830.

Thus, the method of FIG. 8 permits use of the minimum and maximum capacitive couplings for any paths of the same layout which do not involve pre-grouped patterns, and to use the nominal couplings for paths which include pre-grouped patterns.

Figure 9:
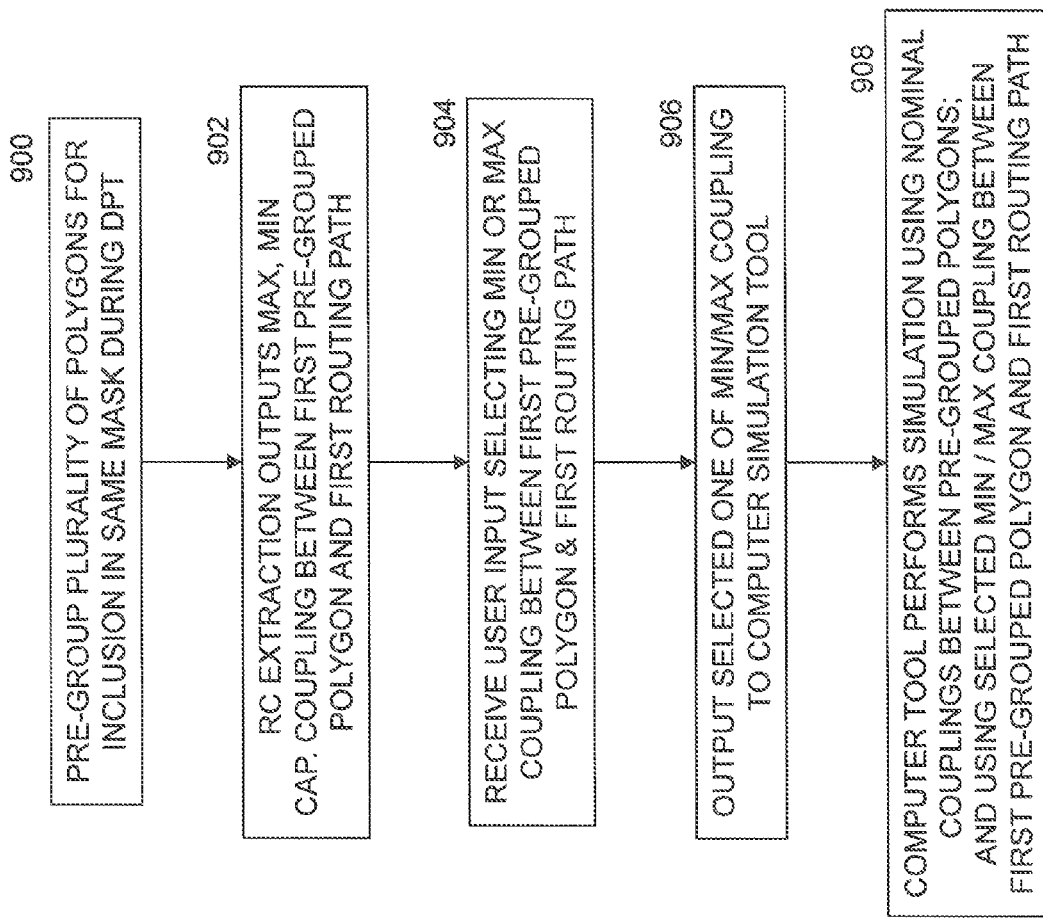
FIG. 9 is a flow chart of a variation in which user inputs are combined with RC extraction information to determine the RC couplings used for simulation.

FIGS. 3 and 9 shows an additional capability provided in some embodiments. As shown in FIG. 3, given a set of polygons, the designer may decide to pre-group polygons 302 and 304, so that the parasitic capacitive coupling between those two patterns is not affected by mask misalignment. Because patterns 302 and 304 are adjacent, they will be spaced apart from each other by a distance 312 sufficient to be formed using the same photomask. The remaining patterns 300 and 306 are nominally separated from respective patterns 302 and 304 by respective spacings 311 and 313. Assume that the nominal spacings 311 and 313 are smaller than the minimum distance for forming both patterns with the same photomask. Because of the pre-grouping of patterns 302 and 304 together, patterns 300 and 306 are automatically formed on the same photomask as each other. Thus, the result of a mask misalignment in this scenario is that one of the spacings 311 and 313 is smaller than the nominal spacing, and the other of the spacings 311 and 313 is larger than the nominal spacing. As a result, one of the parasitic capacitive couplings (either the coupling between polygons 300 and 302 or the coupling between polygons 304 and 306) is larger than the nominal coupling and the other is smaller than the nominal coupling. FIG. 9 allows the designer to select which of the couplings is to be larger than nominal, and which is to be smaller than nominal.

At step 900, the user pre-groups a plurality of polygons for inclusion in the same mask during DPT.

At step 902, the RC extraction tool outputs maximum and minimum capacitive couplings between a first one 302 of the pre-grouped polygons and a first one 300 of the plurality of routing paths.

At step 904, the tool receives from the user an input selecting either the minimum or maximum capacitive coupling to be assigned between the first pre-grouped polygon 302 and the first routing path 300.

At step 906, the tool outputs the selected coupling (minimum or maximum) to a computer implemented simulation tool (or to an intermediate non-transitory, computer readable storage medium, for retrieval by a SPICE level simulation tool).

At step 908, the simulation tool performs a simulation using the single nominal capacitive coupling between the first one of the plurality of pre-grouped polygons and a second one of the plurality of pre-grouped polygons, and using the selected one of the minimum capacitive coupling and the maximum capacitive coupling between the first one of the plurality of pre-grouped polygons and the first one of the plurality of routing paths.

The method of FIG. 9 permits the system to output a single selected parasitic capacitive coupling value to a simulation tool 1114 (FIG. 11) that is only configured to receive a single parasitic capacitive coupling between any given pair of patterns.

Figure 10:
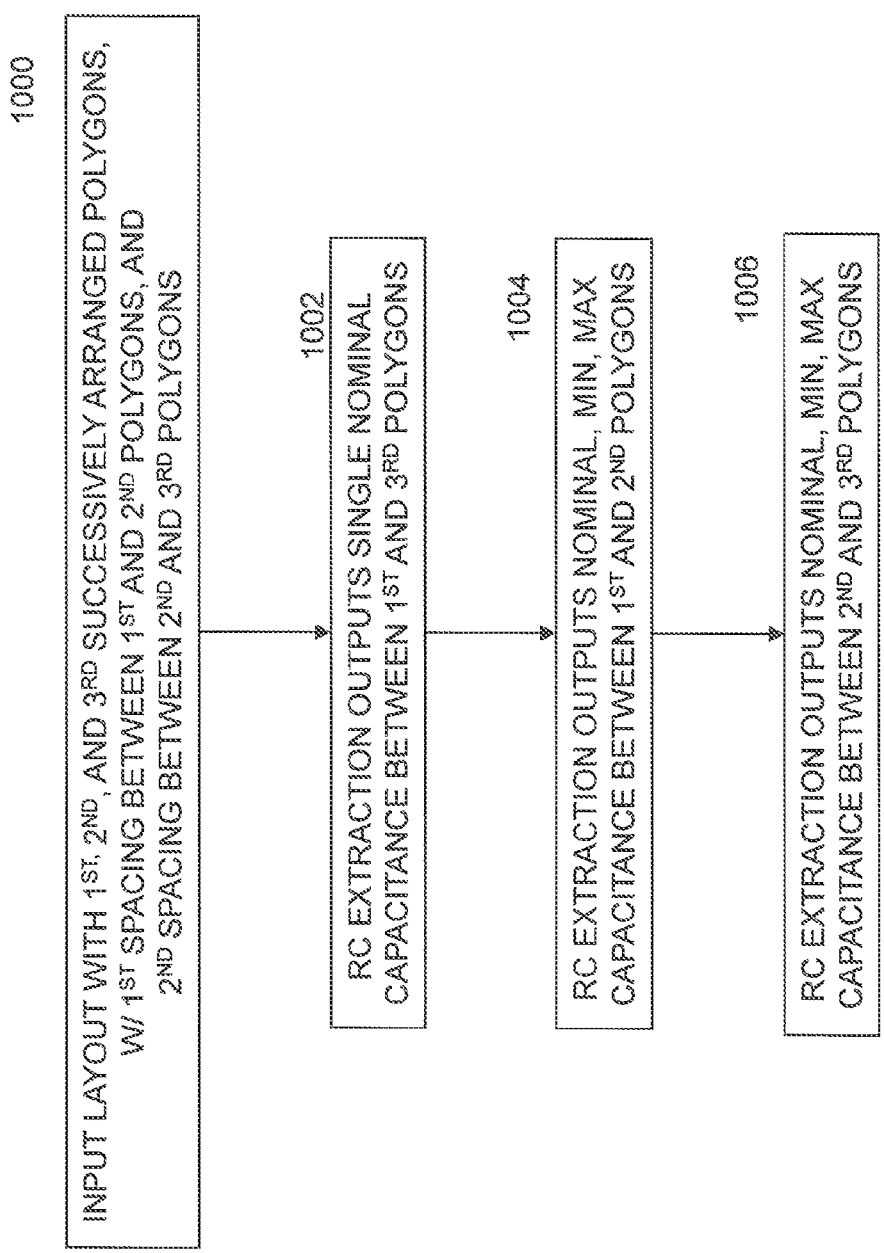
FIG. 10 is a flow chart of a variation which may reduce program run time.

FIG. 10 is a flow chart of an additional optional feature of some embodiments for eliminating unnecessary calculations.

Reference is again made to FIG. 5, wherein the layout further includes a first polygon 500, a second polygon 502 and a third polygon 504 arranged successively, with a first spacing 511 between the first and second polygons 500, 502, and a second spacing 512 between the second and third polygons 502, 504. The first and second spacings 511, 512 are each smaller than a minimum separator distance for forming adjacent patterns using a single photomask.

Using the capability of FIG. 10, the RC extraction only outputting a single nominal capacitive coupling 513 between the first and third polygons 500, 504. Since normal DPT mask assignment techniques locate polygons 500 and 504 on the same mask as each other, the coupling between polygons 500 and 504 is not affected by DPT mask misalignments. Because the values for coupling 513 corresponding to minimum and maximum mask misalignments are the same as the nominal value, the RC extraction tool can output a single coupling 513 between polygons 500 and 504. This reduces run time for the tool.

Figure 11:
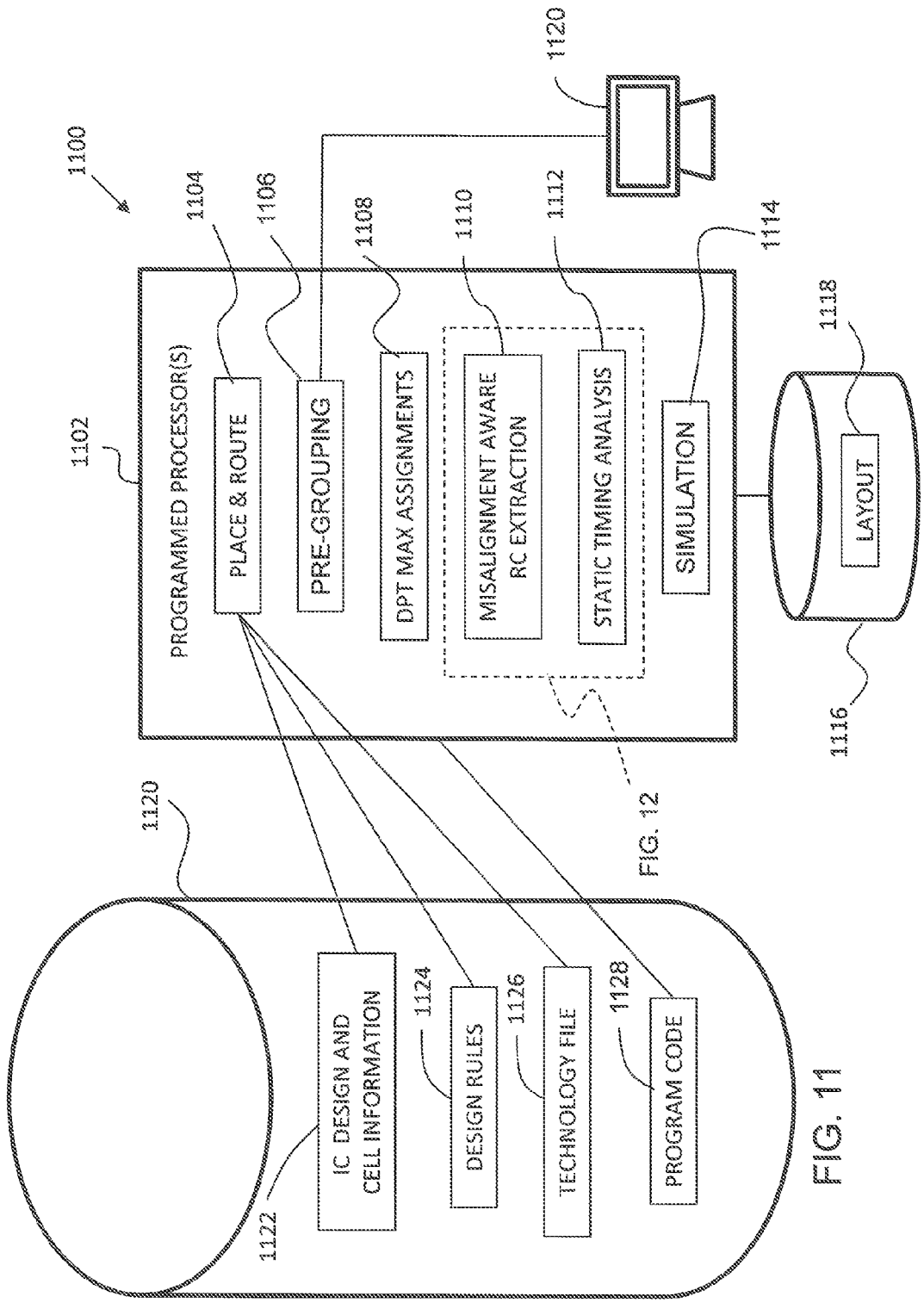
FIG. 11 is a block diagram of a system for design and analysis of an IC design.
Figure 12:
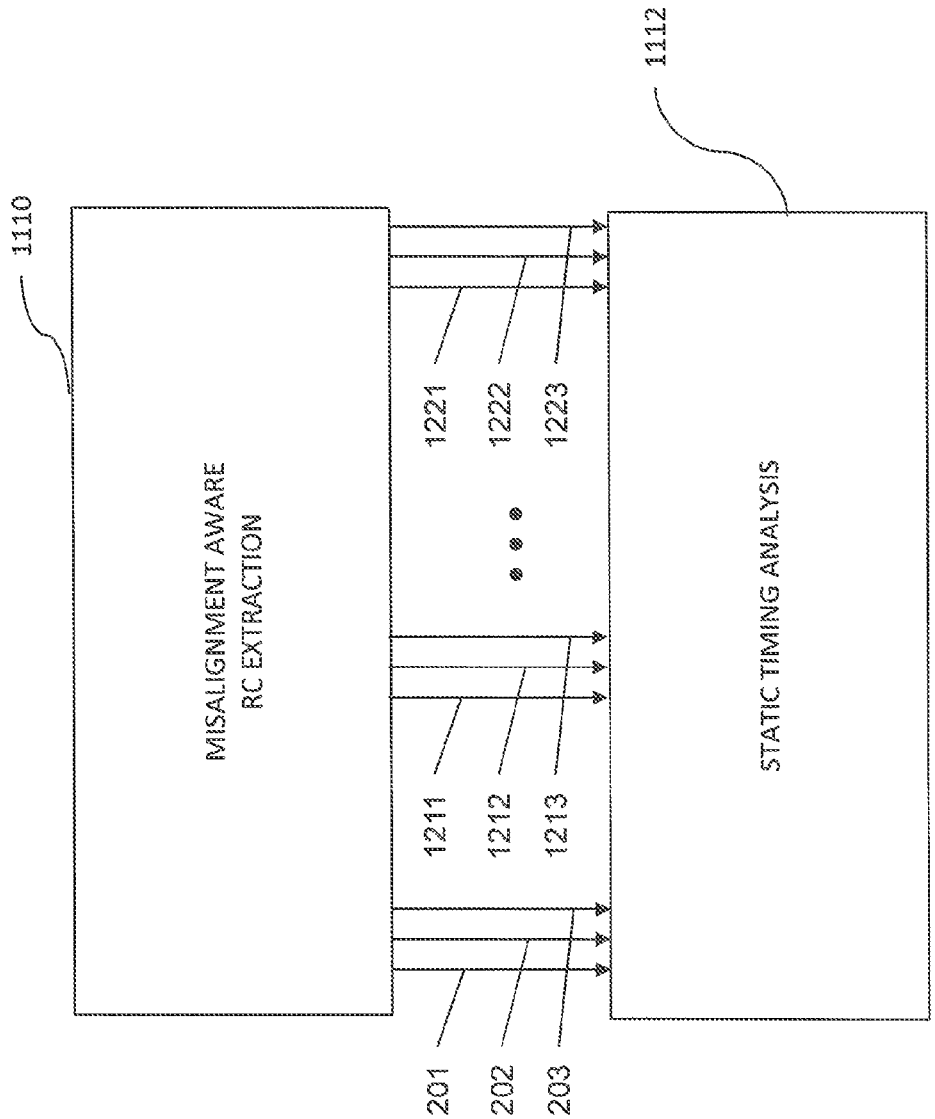
FIG. 12 is a block diagram of a detail of FIG. 11.

FIGS. 11 and 12 are block diagrams of a system 1100 for performing the method described herein.

The system includes at least one non-transitory, machine readable storage medium 1120, 1118 encoded with data representing a layout of an integrated circuit (IC) design. These data include block 1122, which contains the IC design (netlist), designer's custom intellectual property (IP), and standard cell information. Blocks 1124 and 1126 include the design rules and technology file(s) which correspond to a particular IC fabrication technology to be used for fabricating the IC. The medium 1120 further includes computer program code for the various modules shown within processor 1102. Although FIG. 11 shows an example with the data residing on a single medium 1120, the data can be split among any number of storage devices, which can include locally attached devices, devices connected by personal area network (PAN), local area network (LAN), wide area network, or global communications network, such as the internet. The storage media can include, for example, RAMs, ROMs, CD-ROMs, DVD-ROMs, BD-ROMs, hard disk drives, flash memories, or any other non-transitory machine-readable storage medium.

The non-transitory computer readable storage medium 1120 is encoded with computer readable computer program code, such that when a computer 1102 executes the computer program code, the computer performs a method for generating, analyzing, validating or simulating an integrated circuit (IC) design.

System 1100 includes, among other applications, an electronic design automation ("EDA") tool 1102 such as "IC COMPILER"™, sold by Synopsys, Inc. of Mountain View, Calif., which may include a place and route tool 304, such as "ZROUTE"™, also sold by Synopsys. Other EDA tools 1102 may be used, such as the "VIRTUOSO" custom design platform or the Cadence "ENCOUNTER"® digital IC design platform may be used, along with the "VIRTUOSO" chip assembly router, all sold by Cadence Design Systems, Inc. of San Jose, Calif.

The system 1100 has a computer implemented electronic design automation (EDA) tool 1102. The EDA tool may include a variety of modules for design, synthesis, validation, and simulation of the IC design, only a subset of which are included in FIG. 11. Following the development of a device level design, a place and route tool 1104 places the standard cells and generates an initial layout of the custom interconnect routings connecting the various pins of the standard cells to each other. In some embodiments, the tool 1102 ha a pre-grouping module 1106, which permits a user (using input device or computer 1120) to view a portion of the preliminary layout, and to pre-group polygons which should be formed by the same photomask, such as time-critical routing networks. In some embodiments, the user can graphically select the patterns to be grouped. The tool 1102 has a DPT mask assignment module, which assigns the various polygons in a given layer to one of the photomasks, so that any pair of adjacent patterns separated from each other by less than the minimum separation distance (for clear patterning) are formed using different photomasks from each other. The tool 1102 has a misalignment aware RC extraction module 1110 to perform a parasitic RC extraction for the layout of the IC design. The parasitic RC extraction module 1110 outputs, for each of a plurality of routing paths, a nominal capacitive coupling, a minimum capacitive coupling and a maximum capacitive coupling, where the minimum and maximum capacitive couplings correspond to circuit patterning in the presence of double patterning mask misalignments.

A computer implemented static timing analysis (STA) tool 1112 is programmed to perform one of a setup time analysis and/or a hold time analysis of the IC design. The STA tool 1112 is capable of accepting three values (nominal, minimum and maximum) for the parasitic capacitive coupling between each respective pair of routing patterns. For a given flip-flop having launch and capture paths, the setup or hold time analyses is performed using the minimum capacitive coupling for one of the capture path and the launch path and the maximum capacitive coupling for the other of the capture path and the launch path.

In some embodiments, the processor(s) 1102 has a simulation tool for performing SPICE level (device level) simulation.

A medium 1116 is provided for receiving and storing the final layout 1118, including the DPT mask assignment information.

Although FIG. 11 shows a number of modules executed by a single computer, any number of computers can be used. The various modules shown can be hosted by the various computers in any combination. Although FIG. 11 shows an allocation of the various tasks to specific modules, this is only one example. The various tasks may be assigned to different modules to improve performance, or improve the ease of programming.

FIG. 12 is a block diagram showing a detail of FIG. 11. In FIG. 12, the misalignment-aware RC extraction module is configured to generate three values for each parasitic capacitive coupling, and the STA tool is configured to receive three values for each parasitic capacitive coupling, and to use the techniques described above to select the appropriate coupling to use between a given pair of polygons (circuit patterns) during the STA analysis. Thus, nominal parasitic capacitive couplings 1201, 1211 and 1221 are supplemented by maximum parasitic capacitive couplings 1202, 1212 and 1222 and minimum parasitic capacitive couplings 1203, 1213 and 1223. The connections between modules in FIG. 12 may be either by inter-process communication, telecommunications, or by way of a shared access storage medium.

In some embodiments, a method for analyzing an integrated circuit (IC) design, comprises: (a) using a computer implemented electronic design automation (EDA) tool to perform a parasitic RC extraction for a layout of the IC design, the parasitic RC extraction outputting for each of a plurality of routing paths, a nominal capacitive coupling, a minimum capacitive coupling and a maximum capacitive coupling, where the minimum and maximum capacitive couplings correspond to circuit patterning in the presence of double patterning mask misalignments; and (b) performing one of a setup time analysis or a hold time analysis of the IC design using a computer implemented static timing analysis (STA) tool, wherein for a given flip-flop having launch and capture paths, the setup or hold time analyses is performed using the minimum capacitive coupling for one of the launch and capture paths and the maximum capacitive coupling for the other of the launch and capture paths.

In some embodiments, a system comprises: a non-transitory, machine readable storage medium encoded with data representing a layout of an integrated circuit (IC) design; a computer implemented electronic design automation (EDA) tool programmed to perform a parasitic RC extraction for the layout of the IC design, the parasitic RC extraction outputting for each of a plurality of routing paths, a nominal capacitive coupling, a minimum capacitive coupling and a maximum capacitive coupling, where the minimum and maximum capacitive couplings correspond to circuit patterning in the presence of double patterning mask misalignments; and a computer implemented static timing analysis (STA) tool programmed to perform one of a setup time analysis or a hold time analysis of the IC design, wherein for a given flip-flop having launch and capture paths, the setup or hold time analyses is performed using the minimum capacitive coupling for one of the launch and capture paths and the maximum capacitive coupling for the other of the launch and capture paths.

In some embodiments, a non-transitory computer readable storage medium is encoded with computer readable computer program code, such that when a computer executes the computer program code, the computer performs a method for analyzing an integrated circuit (IC) design, comprising: using a computer implemented electronic design automation (EDA) tool to perform a parasitic RC extraction for a layout of the IC design, the parasitic RC extraction outputting for each of a plurality of pairs of routing paths, a nominal capacitive coupling, a minimum capacitive coupling and a maximum capacitive coupling, where the minimum and maximum capacitive couplings correspond to circuit patterning in the presence of double patterning mask misalignments; and performing one of a setup time analysis or a hold time analysis of the IC design using a computer implemented static timing analysis (STA) tool, wherein for a given flip-flop having launch and capture paths, the setup or hold time analyses is performed using the minimum capacitive coupling for one of the launch and capture paths and the maximum capacitive coupling for the other of the launch and capture paths.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for analyzing an integrated circuit (IC) design, comprising:
    identifying a first capacitive coupling and a second capacitive coupling for each of a plurality of timing paths in the IC design, where the first and second capacitive couplings correspond to respective double patterning mask misalignments; and
    using a computer to perform one of a setup time analysis or a hold time analysis of the IC design, wherein for a given synchronizing element having a launch path and a capture path, the setup or hold time analyses is performed using the first capacitive coupling for one of the launch and capture paths and the second capacitive coupling for the other of the launch and capture paths.

2. The method of claim 1, wherein:
    the given synchronizing element is a launch flip-flop; and
    the setup time analysis is performed using the second capacitive coupling for the data path of the launch flip-flop and the first capacitive coupling for a clock path of the launch flip-flop.

3. The method of claim 2, wherein:
    the layout includes a capture flip-flop downstream from the launch flip-flop; and
    the setup time analysis uses the corresponding second capacitive coupling for a corresponding data path of the capture flip-flop and the corresponding first capacitive coupling for a corresponding clock path of the capture flip-flop.

4. The method of claim 1, wherein:
    the given synchronizing element is a capture flip-flop; and
    the hold time analysis is performed using the second capacitive coupling for the capture path and the first capacitive coupling for the launch path.

5. The method of claim 4, wherein:
the layout includes a launch flip-flop upstream from the capture flip-flop; and
the hold time analysis uses the corresponding first capacitive coupling for the corresponding launch path of the launch flip-flop and the corresponding second capacitive coupling for the corresponding capture path of the capture flip-flop.

6. The method of claim 1, wherein the RC extraction includes computing a first capacitive coupling and a second capacitive coupling for each of the plurality of routing paths by identifying a maximum expected mask misalignment value (MEMM), and computing capacitive couplings for a first scenario in which the mask misalignment is +1*MEMM and for a second scenario in which the mask misalignment is −1*MEMM.

7. The method of claim 1, wherein the layout further includes a plurality of pre-grouped polygons, selected to be included in the same photomask as each other when the layout is divided into two photomasks for double patterning, and the RC extraction further includes outputting only a single nominal capacitive coupling within each pair of the plurality of pre-grouped patterns.

8. The method of claim 7, further comprising performing an additional one of a setup time analysis or a hold time analysis for an additional synchronizing element having a launch path and a capture path, wherein one of the launch and capture paths includes one of the plurality of pre-grouped polygons, the additional setup time or hold time analyses is performed using the single nominal capacitive coupling for the one of the launch and capture paths including the pre-grouped polygons, and using one of the first capacitive coupling and the second capacitive coupling for the other one of the launch and capture paths.

9. The method of claim 7, wherein:
the RC extraction includes outputting a first capacitive coupling and a second capacitive coupling between a first one of the plurality of pre-grouped polygons and a first one of the plurality of routing paths; and the method further comprises:
receiving an input from a user indicating a selection of one of the first capacitive coupling and the second capacitive coupling between the first one of the plurality of pre-grouped polygons and the first one of the plurality of routing paths; and
outputting the selected one of the first capacitive coupling and the second capacitive coupling to a computer implemented simulation tool, so that the simulation tool performs a simulation using the single nominal capacitive coupling between the first one of the plurality of pre-grouped polygons and a second one of the plurality of pre-grouped polygons, and using the selected one of the first capacitive coupling and the second capacitive coupling between the first one of the plurality of pre-grouped polygons and the first one of the plurality of routing paths.

10. The method of claim 1, wherein the layout further includes first, second and third polygons arranged successively, with a first spacing between the first and second polygons, and a second spacing between the second and third polygons, the first and second spacings each smaller than a minimum separator distance for forming adjacent patterns using a single photomask, and the RC extraction further includes outputting only a single nominal capacitive coupling between the first and third polygons.

11. A system comprising:
a non-transitory, machine readable storage medium encoded with data representing a layout of an integrated circuit (IC) design;
a computer programmed to output for each of a plurality of routing paths of the layout, a nominal capacitive coupling, a first capacitive coupling and a second capacitive coupling, where the first and second capacitive couplings correspond to circuit patterning in the presence of double patterning mask misalignments; and
a computer implemented static timing analysis (STA) tool programmed to perform one of a setup time analysis or a hold time analysis of the IC design, wherein for a given synchronizing element having a launch path and a capture path, the setup or hold time analyses is performed using the first capacitive coupling for one of the launch and capture paths and the second capacitive coupling for the other of the launch and capture paths.

12. The system of claim 11, wherein:
the given synchronizing element is a launch flip-flop;
the setup time analysis is performed using the second capacitive coupling for the data path of the launch flip-flop and the first capacitive coupling for the clock path of the launch flip-flop;
the layout includes a capture flip-flop downstream from the launch flip-flop; and
the setup time analysis uses the corresponding second capacitive coupling for the corresponding data path of the capture flip-flop and the corresponding first capacitive coupling for the corresponding clock path of the capture flip-flop.

13. The system of claim 11, wherein:
the given synchronizing element is a capture flip-flop;
the hold time analysis is performed using the second capacitive coupling for the clock path and the first capacitive coupling for the data path;
the layout includes a launch flip-flop upstream from the capture flip-flop; and
the hold time analysis uses the corresponding first capacitive coupling for the corresponding clock path of the launch flip-flop and the corresponding first capacitive coupling for the corresponding data path of the launch flip-flop.

14. The system of claim 11, wherein the RC extraction is configured for computing the first capacitive coupling and a second capacitive coupling for each of the plurality of routing paths by identifying a maximum expected mask misalignment value (MEMM), and computing capacitive couplings for a first scenario in which the mask misalignment is +1*MEMM and for a second scenario in which the mask misalignment is −1*MEMM.

15. The system of claim 11, wherein the data representing the layout further includes data representing a plurality of pre-grouped polygons, selected to be included in the same photomask as each other, and the computer is further configured for outputting only a single nominal capacitive coupling within each pair of the plurality of pre-grouped patterns.

16. The system of claim 15, wherein the STA tool is configured for performing an additional one of a setup time analysis or a hold time analysis for an additional flip-flop having a launch path and a capture path, wherein one of the launch and capture paths includes one of the plurality of pre-grouped polygons, the additional setup time or hold time analyses is performed using the single nominal capacitive coupling for the one of the launch and capture paths including the pre-grouped polygons, and using one of the first capacitive coupling and the second capacitive coupling for the other one of the launch and capture paths.

17. The system of claim 11, wherein the RC extraction tool is configured for:
outputting a first capacitive coupling and a second capacitive coupling between a first one of the plurality of pre-grouped polygons and a first one of the plurality of routing paths;
receiving an input from a user indicating a selection of one of the first capacitive coupling and the second capacitive coupling between the first one of the plurality of pre-grouped polygons and the first one of the plurality of routing paths; and
outputting the selected one of the first capacitive coupling and the second capacitive coupling to a computer implemented simulation tool, so that the simulation tool performs a simulation using the single nominal capacitive coupling between the first one of the plurality of pre-grouped polygons and a second one of the plurality of pre-grouped polygons, and using the selected one of the first capacitive coupling and the second capacitive coupling between the first one of the plurality of pre-grouped polygons and the first one of the plurality of routing paths.

18. A non-transitory computer readable storage medium encoded with computer readable computer program code, such that when a computer executes the computer program code, the computer performs a method for analyzing an integrated circuit (IC) design, comprising:
using a computer to output for each of a plurality of pairs of routing paths, a nominal capacitive coupling, a first capacitive coupling and a second capacitive coupling, where the first and seconde capacitive couplings correspond to circuit patterning in the presence of double patterning mask misalignments; and
performing one of a setup time analysis or a hold time analysis of the IC design using a computer implemented static timing analysis (STA) tool, wherein for a given synchronizing element having a launch path and a capture path, the setup or hold time analyses is performed using the first capacitive coupling for one of the launch and capture paths and the second capacitive coupling for the other of the launch and capture paths.

19. The storage medium of claim 18, wherein:
the given synchronizing element is a launch flip-flop;
the setup time analysis is performed using the second capacitive coupling for the data path of the launch flip-flop and the first capacitive coupling for the clock path of the launch flip-flop;
the layout includes a capture flip-flop downstream from the launch flip-flop; and
the setup time analysis uses the corresponding second capacitive coupling for the corresponding data path of the capture flip-flop and the corresponding first capacitive coupling for the corresponding clock path of the capture flip-flop.

20. The storage medium of claim 18, wherein:
the given synchronizing element is a capture flip-flop;
the hold time analysis is performed using the second capacitive coupling for the clock path and the first capacitive coupling for the data path;
the layout includes a launch flip-flop upstream from the capture flip-flop; and
the hold time analysis uses the corresponding first capacitive coupling for the corresponding data path of the launch flip-flop and the corresponding second capacitive coupling for the corresponding clock path of the launch flip-flop.

* * * * *